A. G. ELVIN.
JOINTED CONDUIT.
APPLICATION FILED JULY 1, 1910.
998,883.
Patented July 25, 1911.
2 SHEETS—SHEET 2.
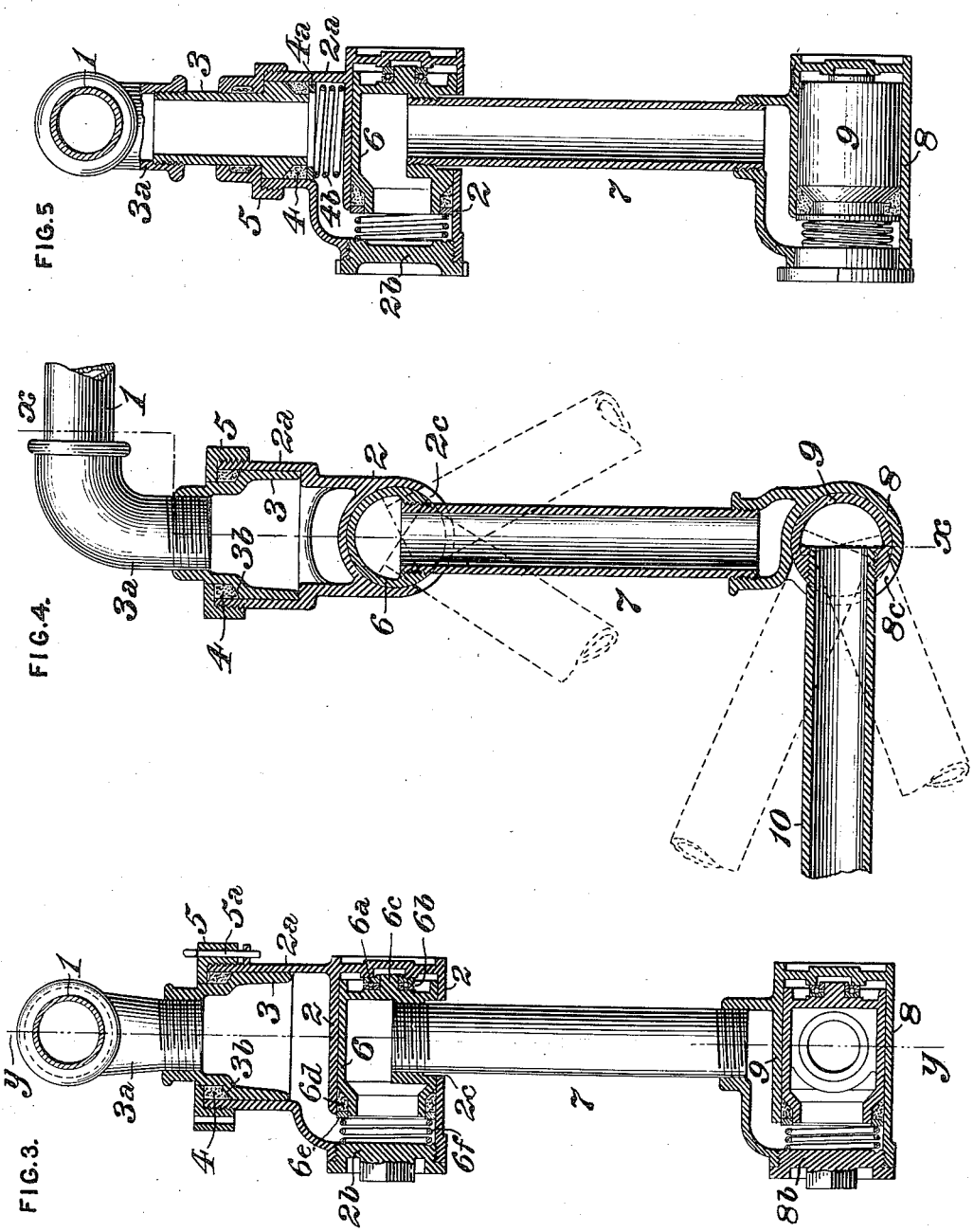
WITNESSES
James C. Herron.
S. R. Bell.
INVENTOR
Albert G. Elvin.
by Howden Bell,
atty.

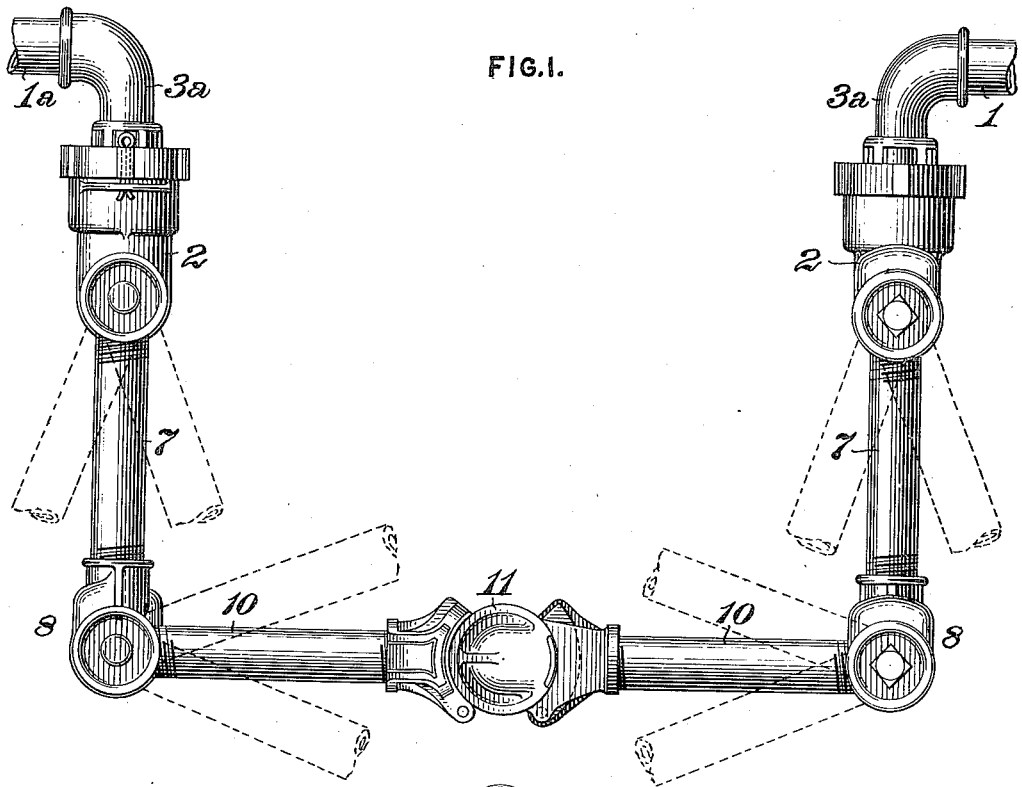
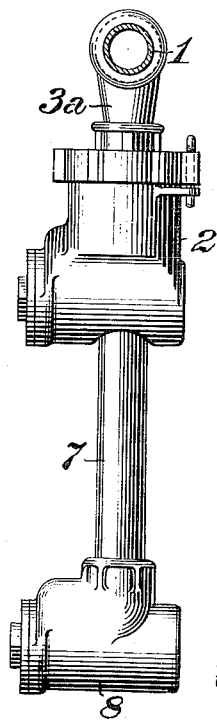

UNITED STATES PATENT OFFICE.

ALBERT G. ELVIN, OF EAST ORANGE, NEW JERSEY.

JOINTED CONDUIT.

998,883. Specification of Letters Patent. Patented July 25, 1911.

Application filed July 1, 1910. Serial No. 569,853.

*To all whom it may concern:*

Be it known that I, ALBERT G. ELVIN, of East Orange, in the county of Essex and State of New Jersey, have invented a certain new and useful Improvement in Jointed Conduits, of which improvement the following is a specification.

My invention relates to metallic conduits for the conveyance of fluid under pressure from one railroad vehicle to another, and its object is to provide a conduit of such character which will embody the advantages of presenting straight line connections at its joints, minimum wear and friction at the joints and tight packing thereof, a reduction in the number of screwed joints required, and greater area for the passage of fluid through the joints than through the connected pipe sections.

The improvement claimed is hereinafter fully set forth.

In the accompanying drawings: Figure 1 is a view, in side elevation, of a flexible conduit illustrating an embodiment of my invention; Fig. 2, an end elevation of the same; Fig. 3, a vertical section, on an enlarged scale, on the line $x\ x$ of Fig. 4; Fig. 4, a similar section, on the line $y\ y$ of Fig. 3; and, Fig. 5, a section similar to Fig. 3, showing a structural modification.

My invention is herein exemplified in an articulated metallic conduit, connecting a steam or air pipe line section, 1, fixed upon a railroad vehicle, with another pipe line section, 1ª, fixed on a car coupled thereto, in such manner that steam, or air under pressure, may be conveyed from one pipe line section to the other, without impairment of the continuity and fluid pressure tightness of the connection by relative movement of the coupled cars, such movement being permitted by the articulation of the sections of the conduit, instead of, as in ordinary practice, by the flexibility of rubber hose.

Referring first to Figs. 1 to 4 inclusive, in the practice of my invention, an upper joint body, 2, is provided for, and jointed, as hereinafter described, to each of the pipe line sections, 1 and 1ª, said joint bodies being identical in construction, so that the description of either of them is equally applicable to the other. A sleeve, 3, is connected by a downwardly depending elbow, 3ª, to each of the pipe line sections, 1 and 1ª, said sleeve being enlarged in diameter beyond the elbow, to provide a tapered peripheral seat, 3ᵇ, for a gasket, 4, of suitable packing material. A tubular extension or neck, 2ª, is formed upon the top of each joint body, its internal diameter being such as to enable it to fit neatly around the sleeve, 3, of the pipe line section, 1 or 1ª, to which the joint body is to be connected, and around the gasket, 4, of said sleeve. The neck, 2ª, is externally threaded to engage a nut, 5, which fits over, and bears on, the top of the gasket, 4, and fits freely around the sleeve, 3, above the neck, 2ª. The nut, 5, may be locked in position when brought to a proper bearing on the neck, 2ª, by a split pin, 5ª, passing through a lug on the neck, 2ª. The joint body and the members connected thereto, are held by their own gravity to a bearing on the gasket, 4, and thereby connected with the pipe line section, and the joint body is free to turn about the common vertical axis of the lower arm of the fixed pipe line section elbow, 3ª, and the neck, 2ª, of the upper joint body.

The lower portion of the upper joint body, 2, is bored out horizontally to receive a sleeve, 6, which is inserted through an opening in one end of the joint body, closed by a removable cap, 2ᵇ, and is fitted to turn freely in the bore of the joint body. A normally vertical connecting pipe section, 7, is passed through a transverse sectoral slot, 2ᶜ, in the joint body, and screwed into the sleeve, 6, after the insertion of the latter in position in the joint body. The upper joint body, 2, thus may be termed a double joint, as it provides the capacity of two motions for the pipe section, 7, one being about the vertical axis of the fixed sleeve, 3, and the other, through the slot, 2ᶜ, about the horizontal axis of the movable sleeve, 6, as indicated in dotted lines, in Figs. 1 and 4. These two motions enable the appliance to be accommodated to the slack between railroad vehicles, and to the passage thereof around curves of the shortest radius, with a reduction of friction to the minimum. The sleeve, 6, abuts against the closed end of the upper joint body, 2, through the interposition of ball bearings, 6ª, carried in a ball race, 6ᵇ, which fits on a central hub, 6ᶜ, on the adjacent end of the sleeve, 6, and is held in position by riveting over the end of the hub, 6ᶜ. A packing gasket, 6ᵈ, is fitted between the sleeve, 6, and joint body, 2, at the opposite end of the sleeve, with a follower ring, 6ᵉ, on its outer side, and a spring, 6ᶠ, which abuts against the follower ring and the cap, 2ᵇ, holds the sleeve solidly in the joint body when running without pressure and prevents rattling and undue wear. The ball race acts as a thrust bearing and eliminates about 90 per cent. of the friction which would be encountered with planed bearings.

The lower end of the pipe section, 7, is screwed into a lower joint body, 8, which is bored out horizontally to receive a sleeve, 9, substantially similar in construction to the sleeve, 6, of the upper joint body, and, similarly, fitted to turn freely in the joint body, 8. The sleeve, 9, is inserted through an opening in one end of the joint body, closed by a removable cap, 8ᵇ, and is provided with a ball bearing, packing gasket, follower ring, and spring, similar to the corresponding accessories, above described, of the sleeve, 6. A normally horizontal connecting pipe section, 10, is passed through a transverse sectoral slot, 8ᶜ, in the joint body, 8, which slot is located on the side of the joint body, or at right angles to the slot, 2ᶜ, of the upper joint body, and the pipe section, 10, is screwed into the sleeve, 9, after the insertion of the latter in position in the joint body. The lower joint body may be termed a single joint, as it provides the capacity of one motion only for the pipe section, this being about the horizontal axis of the joint body, 8, and sleeve, 9, as indicated in dotted lines in Figs. 1 and 4, and being the only movement necessary to enable the pipe section, 10, to be coupled to a corresponding section.

The outer end of the pipe section, 10, is screwed into one of the members or halves of a hose coupling, 11, of the standard form, a similar pipe section, 10, being connected to the other half coupling, and the connections of said second pipe section, 10, to the pipe line section, 1ᵃ, of the adjoining railroad vehicle being, in all particulars, similar to those above described.

Fig. 5 illustrates a modification of the disposition of the packing gasket, 4, relatively to the sleeve, 3, which is fixed to the pipe line section, 1, or 1ᵃ. The gasket is, in this case, placed below, instead of above, a shoulder on the sleeve, 3, and is held in position by a follower ring, 4ˣ, and spring, 4ᵇ. The nut, 5, engages an external thread on the neck, 2ᵃ, of the upper joint body, as in the instance first described, but bears on the top of a shoulder on the sleeve, 3, instead of on the gasket, 4. Under this construction, the gasket may be removed and another inserted when desired, without detaching the sleeve, 3, from the elbow of the pipe line section, as would be necessary when the construction first described is employed.

As will be recognized by those skilled in the art to which my invention relates, it presents the practical advantages of providing a straight line connection in the hanging of the joints; perfectly tight packing joints with minimum wear and friction; a substantial reduction in the number of screwed joints and consequent liability to leakage, these joints being used only on the connections of the pipe sections to the joint bodies; greater area of opening for the passage of fluid through the joints than through the pipe sections, instead of restriction at the joints, which has been an objectionable feature of prior appliances; and great facility in connecting the members on adjoining vehicles by the use of the standard hose couplings, by reason of the slight friction at the joints and the consequent capability of easily moving the pipe sections to be coupled, both vertically and horizontally, instead of handling hose sections which have become rigid by vulcanization and difficult to bend.

I claim as my invention and desire to secure by Letters Patent:

1. In a jointed conduit, the combination of a sleeve adapted to be rigidly connected to a pipe line section, an upper joint body coupled to said sleeve with the capacity of movement about the axis thereof, a joint sleeve fitting in said upper joint body, with the capacity of movement about an axis at right angles to that of the pipe line section sleeve, said joint sleeve being closed at one end and open to pressure at the other end only, a connecting pipe section fixed to the joint sleeve and projecting through a transverse sectoral slot in the upper joint body, a lower joint body fixed to the opposite end of the connecting pipe section, a joint sleeve fitting in said lower joint body, with the capacity of movement about an axis at right angles to that of the connecting pipe section, said joint sleeve being closed at one end and open to pressure at the other end only, another connecting pipe section fixed to said joint sleeve and projecting through a transverse sectoral slot in the lower joint body, and a half coupling member fixed to said last specified connecting pipe section.

2. In a jointed conduit, the combination of a sleeve adapted to be rigidly connected to a pipe line section, an upper joint body fitted to turn freely on said sleeve, a packing gasket interposed between the sleeve and upper joint body, a nut engaging the joint body and suspending it upon the sleeve, a joint sleeve fitting in the upper joint body with the capacity of movement about an axis at right angles to that of the pipe line section sleeve, a connecting pipe section fixed to the joint sleeve and projecting through a transverse sectoral slot in the upper joint body, another connecting pipe section coupled to the first specified connecting pipe section, with the capacity of movement about an axis at right angles to that of said section, the central planes of both of said connecting pipe sections coinciding with that of the pipe line section sleeve, and a half coupling member fixed to said last specified connecting pipe section.

3. In a jointed conduit, the combination of a sleeve adapted to be rigidly connected to a pipe line section, an upper joint body fitted to turn freely on said sleeve, a packing gasket interposed between the sleeve and upper joint body under a shoulder on the sleeve, a spring imposing pressure on said packing gasket, a nut engaging the joint body and suspending it upon a shoulder on the sleeve above the bearing of the packing gasket thereon, a joint sleeve fitting in the upper joint body with the capacity of movement about an axis at right angles to that of the pipe line section sleeve, a connecting pipe section fixed to the joint sleeve and projecting through a transverse sectoral slot in the upper joint body, another connecting pipe section coupled to the first specified connecting pipe section, with the capacity of movement about an axis at right angles to that of said section, and a half coupling member fixed to said last specified connecting pipe section.

4. In a jointed conduit, the combination of a sleeve adapted to be rigidly connected to a pipe line section, an upper joint body fitted to turn freely on said sleeve, a nut engaging the joint body and suspending it upon the sleeve, a joint sleeve fitting in the upper joint body, with the capacity of movement about an axis at right angles to that of the pipe line section sleeve, a ball race fixed to a hub on the joint sleeve, ball bearings in said ball race through which the joint sleeve bears on the joint body, a spring imposing pressure on the joint sleeve and ball bearings, a connecting pipe section fixed to the joint sleeve and projecting through a transverse sectoral slot in the upper joint body, another connecting pipe section coupled to the first specified connecting pipe section, with the capacity of movement about an axis at right angles to that of said section, and a half coupling member fixed to said last specified connecting pipe section.

5. In a jointed conduit, the combination of a sleeve adapted to be rigidly connected to a pipe line section, an upper joint body fitted to turn freely on said sleeve, a nut engaging the joint body and suspending it upon the sleeve, a joint sleeve fitting in the upper joint body, with the capacity of movement about an axis at right angles to that of the pipe line section sleeve, a packing gasket interposed between the upper joint body and the joint sleeve, a removable cap closing one end of the upper joint body, a spring bearing on said cap and on the joint body, a connecting pipe section fixed to the joint sleeve and projecting through a transverse sectoral slot in the upper joint body, another connecting pipe section coupled to the first specified connecting pipe section, with the capacity of movement about an axis at right angles to that of said section, and a half coupling member fixed to said last specified connecting pipe section.

ALBERT G. ELVIN.

Witnesses:
F. W. MARTIN,
W. S. ALLISON.